(12) United States Patent
Kendall

(10) Patent No.: US 8,071,012 B2
(45) Date of Patent: Dec. 6, 2011

(54) TEMPERATURE MEASURING DEVICE

(75) Inventor: Martin Kendall, Hasselt (BE)

(73) Assignee: Heraeus Electro-Nite International N.V., Houthalen (BE)

( * ) Notice: Subject to any disclaimer, the term of this patent is extended or adjusted under 35 U.S.C. 154(b) by 0 days.

(21) Appl. No.: 12/706,998

(22) Filed: Feb. 17, 2010

(65) Prior Publication Data

US 2010/0207306 A1 Aug. 19, 2010

Related U.S. Application Data

(60) Provisional application No. 61/153,480, filed on Feb. 18, 2009, provisional application No. 61/176,316, filed on May 7, 2009.

(51) Int. Cl.
*C21B 7/24* (2006.01)
*G01K 1/14* (2006.01)

(52) U.S. Cl. ............. 266/99; 266/220; 266/217; 374/139

(58) Field of Classification Search .............. 266/99, 266/220, 217; 374/139, 179, 208, 140, 163, 374/E1.018, E7.004, 158
See application file for complete search history.

(56) References Cited

U.S. PATENT DOCUMENTS

| | | | |
|---|---|---|---|
| 3,091,119 A * | 5/1963 | Fischer et al. | 374/139 |
| 3,610,045 A | 10/1971 | Shearman | |
| 4,871,263 A * | 10/1989 | Wilson | 374/139 |
| 4,981,904 A * | 1/1991 | Fischer | 524/601 |
| 5,209,571 A | 5/1993 | Kendall | |
| 5,360,269 A * | 11/1994 | Ogawa et al. | 374/140 |
| 5,361,825 A | 11/1994 | Lax et al. | |
| 5,388,908 A * | 2/1995 | Kendall | 374/140 |
| 6,231,806 B1 | 5/2001 | Rodrigues et al. | |
| 6,280,083 B2 * | 8/2001 | Kita et al. | 374/140 |
| 6,632,018 B2 * | 10/2003 | Isshiki et al. | 374/179 |
| 7,198,181 B2 | 4/2007 | Richard et al. | |
| 2006/0002449 A1 | 1/2006 | Kendall | |
| 2007/0053405 A1 | 3/2007 | Kendall | |

FOREIGN PATENT DOCUMENTS

| | | |
|---|---|---|
| EP | 0 413 894 A1 | 2/1991 |
| EP | 1 340 563 A2 | 9/2003 |
| GB | 924408 A | 4/1963 |
| GB | 2259974 A | 3/1993 |
| JP | 2-264834 A | 10/1990 |

OTHER PUBLICATIONS

Office Action issued Aug. 31, 2011 in U.S. Appl. No. 12/984,065.
Int'l Preliminary Report on Patentability issued Sep. 1, 2011 in Int'l Application No. PCT/EP2010/000987.

* cited by examiner

*Primary Examiner* — Roy King
*Assistant Examiner* — Michael Aboagye
(74) *Attorney, Agent, or Firm* — Panitch Schwarze Belisario & Nadel LLP

(57) ABSTRACT

A temperature measuring device for molten metal includes a porous plug with a first end and an opposed second end, an outer protective sheath with a closed end, an inner protective tube with a closed end, and a thermocouple arranged within an interior of the inner protective tube. The outer protective sheath extends away from the first end of the plug and the inner protective tube is arranged within an interior of the outer protective sheath. The porous plug comprises a substantially refractory material and the outer protective sheath consists essentially of substantially refractory metal oxide and graphite. A junction of the thermocouple is proximate to the closed end of the inner protective tube.

11 Claims, 5 Drawing Sheets

TEMPERATURE MEASURING DEVICE

CROSS-REFERENCE TO RELATED APPLICATIONS

This application claims the benefit of U.S. Provisional Patent Application Nos. 61/153,480, filed Feb. 18, 2009, and 61/176,316, filed May 7, 2009, the entire contents of which are incorporated by reference herein.

BACKGROUND OF THE INVENTION

The invention relates to a device for measuring the temperature of metal melts and, more particularly, for continuously measuring the temperature of a molten metal through the wall of a metallurgical container or vessel. The invention further relates to the use of porous purging plugs in such containers or vessels.

Porous purging plugs have a key role when manufacturing steel. One or more porous purging plugs are replaceably mounted in the bottom of a ladle or other metallurgical vessel. In the vessel, various high-temperature chemical processes are carried out in which the porous purging plug is crucial, since inert gas, such as argon, is conveyed through the plug for purging the molten metal. Generally, bubbles are created by the purge gas, which cause a vortex of steel around the plug, leading to a buildup of metal on the plug. Chemical erosion of the plug is caused by metal build-up and physical erosion is caused by continuous washing of the steel against the plug. Thus, the uppermost portion of the purge plug is typically heavily worn during the metallurgical process. Accordingly, the purge plug has to be replaced regularly by a new purge plug when its height has shrunk to a minimum permissible level. Conventional purge plugs, as such, are not highly reliable components for vessels used in manufacturing steel.

It is also generally known from the prior art to use or arrange a thermocouple device in a wall of a metallurgical vessel. In conventional arrangements, the thermocouple device may be susceptible to chemical and mechanical damage due to the molten metal environment in which it is used. Also, it may take a relatively long period of time for the thermocouple device to reach its equilibrium temperature with the metal melt, so that measurements of the melt cannot be taken quickly and efficiently.

BRIEF SUMMARY OF THE INVENTION

Therefore, it would be desirable to provide a temperature measuring device for molten metals that is more durable and functional. Applicant has discovered that a device which provides a porous purge plug in conjunction with a temperature measuring element would be particularly desirable, since the gas injected from the purge plug could serve as an added means of protection for the temperature measuring element. Applicant has further discovered that a temperature measuring device which is arranged in a recessed portion of a metallurgical vessel would be particularly desirable, as metal which has solidified in the recessed portion may protect the temperature measuring device against mechanical and chemical damage.

Briefly stated, the present invention is directed to a temperature measuring device for molten metal which includes a porous plug having a first end and an opposed second end, an outer protective sheath having a closed end, an inner protective tube having a closed end, and a thermocouple arranged within an interior of the inner protective tube. The outer protective sheath extends away from the first end of the porous plug and the inner protective tube is arranged within an interior of the outer protective sheath. The porous plug comprises a substantially refractory material and the outer protective sheath consists essentially of substantially refractory metal oxide and graphite. A junction of the thermocouple is proximate to the closed end of the inner protective tube.

In another aspect, the present invention is directed to a container for molten metal including an outlet for outflow of the molten metal from the container and a temperature measuring device fixed in a wall of the container. The temperature measuring device includes a plug fixed in a wall of the container, an outer protective sheath having a closed end, an inner protective tube having a closed end, and a thermocouple arranged within an interior of the inner protective tube. The plug has a first end and an opposed second end and the inner protective tube is arranged within an interior of the outer protective sheath. The plug comprises a substantially refractory material and the outer protective sheath consists essentially of substantially refractory metal oxide and graphite. The outer protective sheath extends away from the first end of the plug and projects into a recessed portion of the wall of the container. The closed end of the outer protective sheath is arranged in the recessed portion. A junction of the thermocouple is proximate to the closed end of the inner protective tube.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
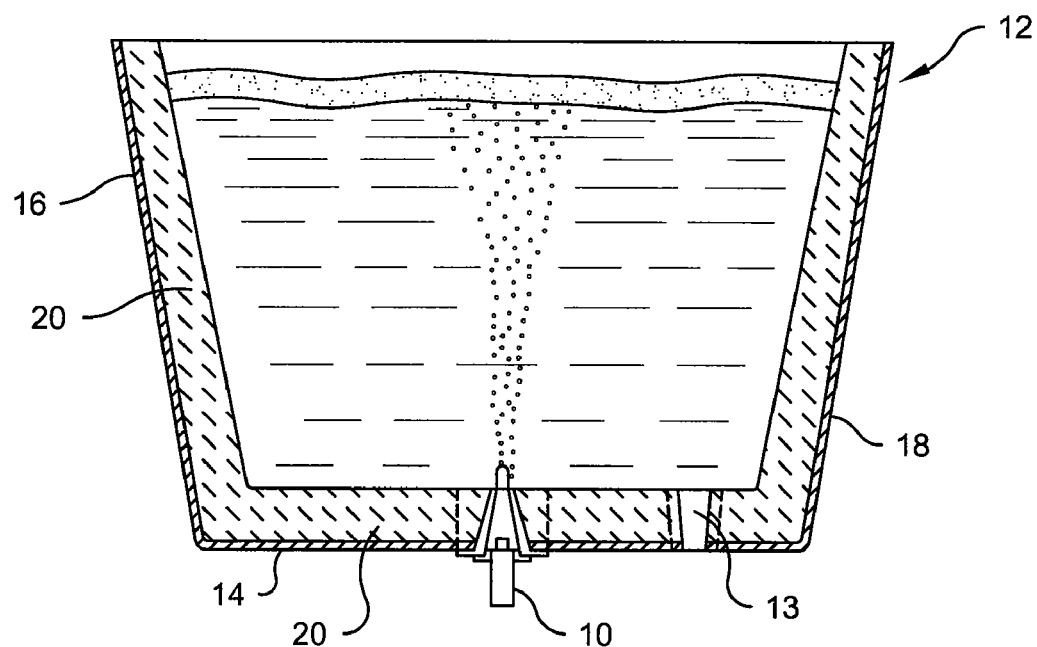
FIG. 1 is a schematic, side cross-sectional view of a container for molten metal having a temperature measuring device, according to an embodiment of the invention, arranged in the bottom wall of the container.

Referring to FIGS. 1-5, a temperature measuring device 10 is shown for continuously measuring the temperature of molten metal. In one embodiment shown in FIG. 1, the temperature measuring device 10 is fixed in a metallurgical vessel 12 through a bottom wall thereof. The metallurgical vessel 12 may be any appropriate container for molten metal that is typically used in connection with steelmaking processes for transporting molten metal to melting, refining, ladle metallurgy, and teeming operations. Preferably, the metallurgical vessel 12 is a ladle having a bottom wall 14 and a generally tubular sidewall 16. The tubular sidewall 16 extends upwardly away from and surrounds the bottom wall 14. The metallurgical vessel 12 also includes an outlet 13 for outflow and removal of the molten metal from the vessel 12. Preferably, the outlet 13 is formed in the bottom wall 14 of the vessel 12 and is provided with a mechanism for controlling the outflow of the molten metal, such as a stopper rod (not shown) or a sliding gate (not shown).

Figure 5:
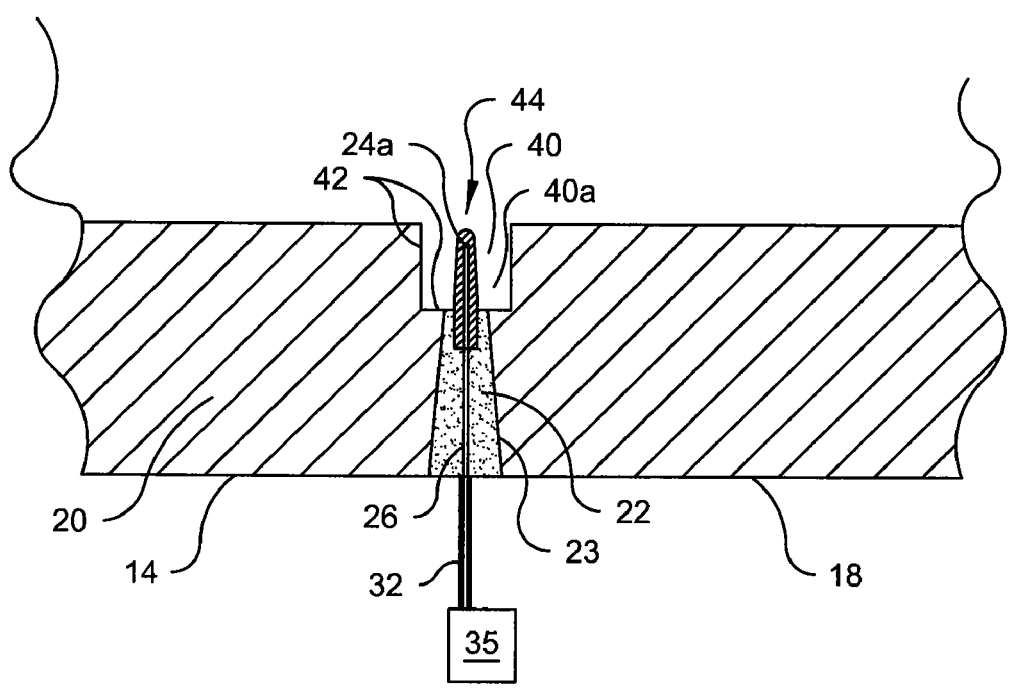
FIG. 5 is a schematic, side cross-sectional view of a portion of a wall of the container for molten metal having a recess for the temperature measuring device according to another embodiment of the invention.

Referring to FIGS. 1 and 5, the metallurgical vessel 12 preferably comprises a refractory material. Specifically, the metallurgical vessel 12 may comprise a metal shell 18 with a refractory material lining 20 interior of the metal shell 18. Preferably, the refractory lining 20 comprises a refractory brick material. However, it will be understood by those skilled in the art that any refractory material capable of providing sufficient resistance against molten metal penetration, corrosion resistance and thermal spalling resistance may be used. The temperature measuring device 10 may be secured through a wall of the metallurgical vessel 12 with fireproof mortar, and may be held in place by a metal cover (not shown) that is bolted or otherwise secured to an exterior surface of the metal shell 18 of the vessel 12.

Figure 2:
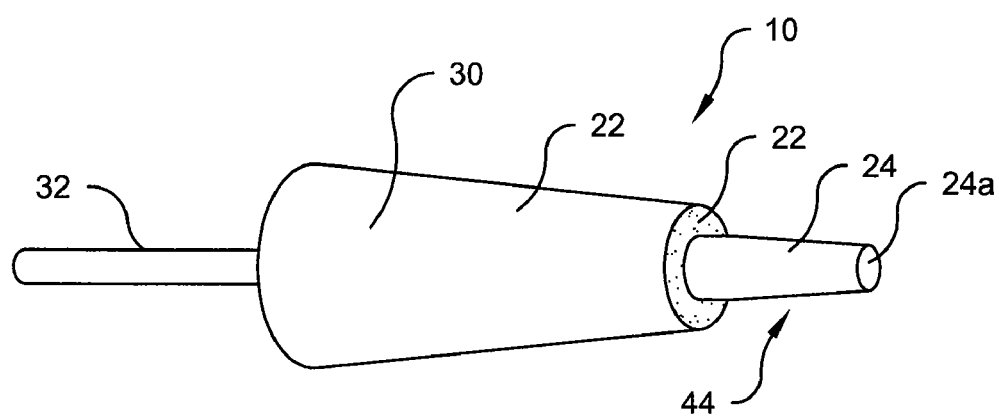
FIG. 2 is a schematic, perspective view of a temperature measuring device according to one embodiment of the invention.
Figure 3:
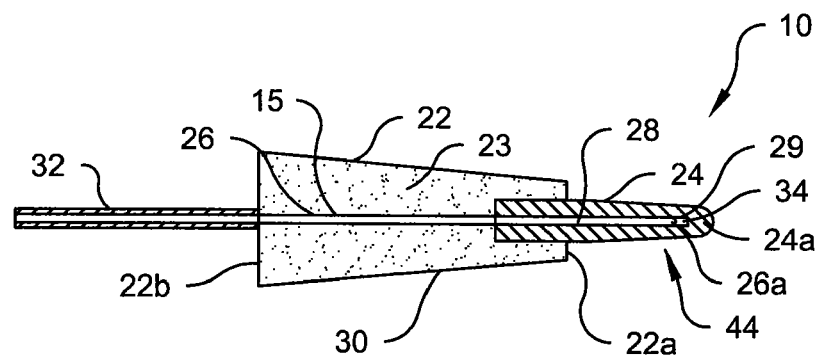
FIG. 3 is a schematic, longitudinal cross-sectional view of the temperature measuring device according to the embodiment of FIG. 2.
Figure 4:
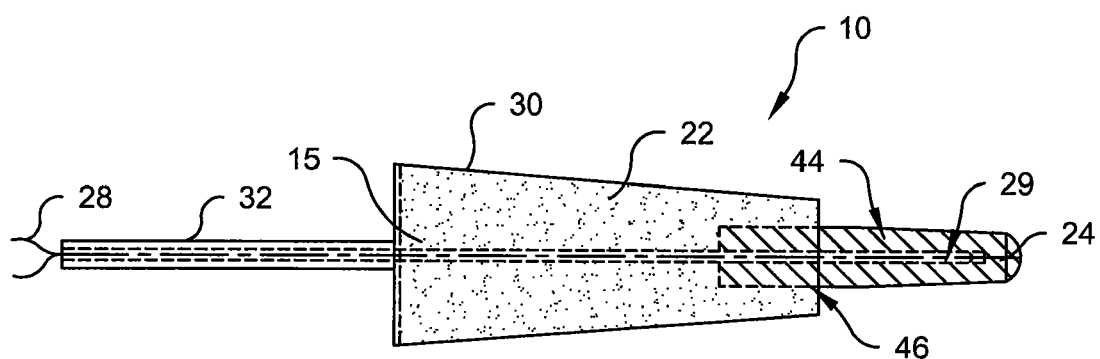
FIG. 4 is another longitudinal cross-sectional view of the temperature measuring device according to the embodiment of FIG. 2, showing the thermocouple inserted therein.

The temperature measuring device 10 of the present invention is preferably fixed in either the bottom wall 14 or the sidewall 16 of the vessel 12. Referring to FIGS. 2-4, the temperature measuring device 10 comprises a plug 22, an outer protective sheath 24 having a closed end 24a, an inner protective tube 26 having a closed end 26a, and a thermocouple 28 arranged within an interior of the inner protective tube 26. A hot junction 29 of the thermocouple 28 is proximate to the closed end 26a of the inner protective tube 26, as shown in FIG. 4.

Referring to FIG. 3, the plug 22 preferably has a first end 22a, an opposed second end 22b and a tapered porous body 23 formed therebetween. Specifically, the body 23 of the plug 22 tapers or narrows from the second end 22b toward the first end 22a, and is generally shaped as a truncated cone having its smaller, truncated end pointing toward the interior of the metallurgical vessel 12 in the installed state. The porous body 23 of the plug 22 comprises a substantially refractory material and is fitted in an opening in the bottom wall 14 or sidewall 16 of the vessel 12, as shown in FIGS. 1 and 5. Preferably, the refractory material of the plug 22 comprises one or more of the materials alumina, magnesia, and a castable alumina-spinel castable, particularly a magnesia-alumina spinel. However, it will be understood by those skilled in the art that the plug 22 may be made of any appropriate refractory material having a sufficiently high thermal strength and providing sufficient resistance against molten metal penetration, corrosion resistance and thermal spalling resistance. Further, the body 23 of the plug 22 is assembled on or at least partially encased by a metal housing 30. Preferably, the housing 30 comprises steel or iron. Due to the refractory material of the plug 22, any portion of the body 23 of the plug 22 that is directly exposed to the molten metal has a non-stick surface which is highly resistant to erosion and to adherence by the slag and molten metal.

Referring to FIGS. 3-4, the outer protective sheath 24 is secured within a straight cylindrical recess 46 formed in the first end 22a of the plug 22. A length of the outer protective sheath 24 extends upwardly away from the first end 22a of the plug 22, such that the closed end 24a of the outer protective sheath 24 is a distal end. The portion of the outer protective sheath 24 which is secured within the plug 22 has a generally straight cylindrical shape, while a majority of the portion of the outer protective sheath 24 extending away from the plug 22 has a generally tapered cylindrical shape. Specifically, the body of the outer protective sheath 24 tapers or narrows from a position proximate to the first end 22a of the plug 22 toward the closed end 24a, such that the closed end 24a is a tapered end pointing toward or extending into the interior of the metallurgical vessel 12 in the installed state.

The inner protective tube 26 is arranged within an interior of the outer protective sheath 24, such that the inner protective tube 26 also extends upwardly away from the first end 22a of the plug 22 and toward the closed end 24a of the outer protective sheath 24. The inner protective tube 26 is preferably a single or monolithic alumina tube. The inner protective tube 26 may alternatively be in the form of a double tube or as a plurality of individual tube segments.

The outer protective sheath 24 is a thermally conductive refractory body formed essentially of substantially refractory metal oxide and graphite, such that the outer protective sheath 24 is sufficiently resistant to aggressive molten metal, particularly molten steel, and is suitable for long-term use. More preferably, the outer protective sheath 24 consists essentially of aluminum oxide and graphite, wherein aluminum oxide comprises approximately 20 to approximately 80 wt. % of the refractory material and graphite comprises approximately 5 to approximately 60 wt. % of the refractory material. It will be understood by those skilled in the art that the outer protective sheath 24 may also contain carbon in a form other than graphite and/or may contain other appropriate refractory oxides.

With the inner protective tube 26 being arranged in the outer protective sheath 24, an intermediate space 34 is formed therebetween, and an insulating material and an oxygen-reducing material may be arranged in the intermediate space 34. The insulating material preferably comprises an oxide, such as aluminum oxide, and the oxygen-reducing material preferably comprises a base metal, such as aluminum.

Figures 6, 6A:
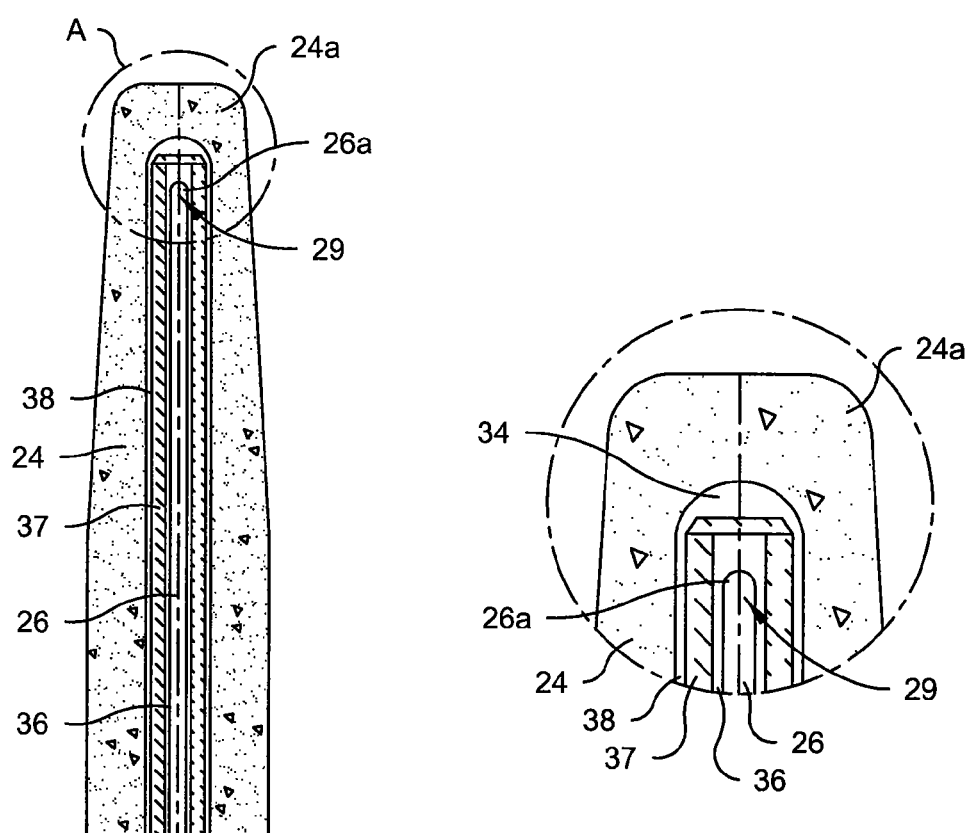
FIG. 6 is partial cross-sectional view of a temperature measuring device according to a further embodiment of the invention.
FIG. 6A is an enlarged cross sectional view of the circled portion A of the temperature measuring device shown in FIG. 6.
Figures 7, 7A:
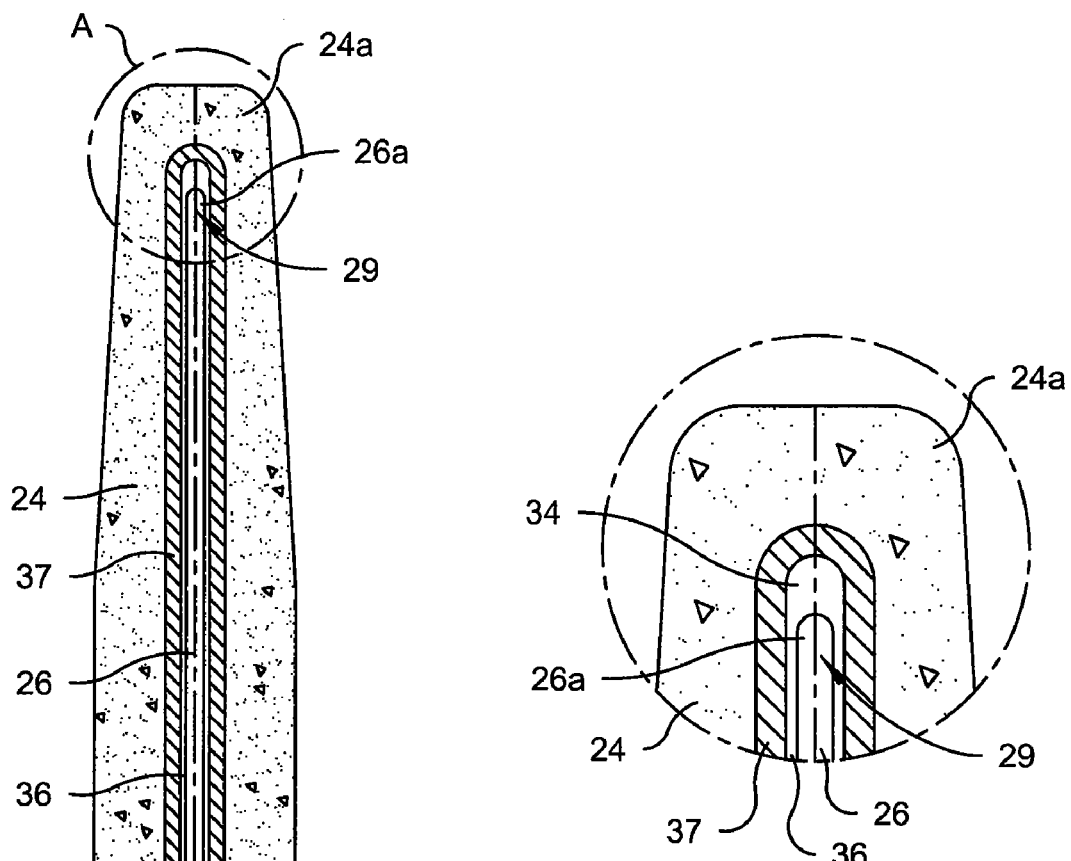
FIG. 7 is partial cross-sectional view of a temperature measuring device, according to a still further embodiment of the invention.
FIG. 7A is an enlarged cross sectional view of the circled portion A of the temperature measuring device shown in FIG. 7.

Referring to FIGS. 6 and 7, the insulating material and the oxygen-reducing material may be in the form of either a powder mixture or in the form of a compacted tube 37 formed from the powder mixture. According to the latter embodiment, the powder mixture tube 37 surrounds the inner protective tube 26 with a first spacing 36, as shown in FIGS. 6A and 7A. Alternatively, or additionally, the powder mixture tube may be surrounded by the outer protective sheath 24 with a second spacing 38, as shown in FIG. 6A. According to another embodiment, shown in FIG. 7-7A, an entire outer surface of the powder mixture tube 37 engages substantially an entire inner surface of the outer protective sheath 24. Because the powder mixture tube 37 is movable relative to either or both of the inner protective tube 26 and the outer protective sheath 24, the overall configuration of the temperature measuring device 10 compensates for thermal stresses and the temperature measuring device 10 is less susceptible to breakage. It will be understood by those skilled in the art that any appropriate configuration of the insulating material and oxygen-reducing material may be used, such as the oxygen-reducing material being in the form of rods, wires, pellets or granules embedded in the insulating material, which is a fill material.

As described above, the body 23 of the plug 22 is arranged or fixed in the bottom wall 14 or sidewall 16 of the vessel 12. Referring to FIG. 5, according to a preferred embodiment of the present invention, the bottom wall 14 or sidewall 16 includes a recessed portion 40 where the temperature measuring device 10 is arranged. Preferably, the recessed portion 40 is formed in the bottom wall 14 of the vessel 12. Specifically, the recessed portion 40 is formed in the refractory lining 20 of the vessel 12.

According to this embodiment, with the plug 22 fixed in a wall of the vessel 14, the body 23 of the plug 22 is fixed in the refractory lining 20, while the outer protective sheath 24 of the temperature measuring device 10 extends into the open area 40a of the recessed portion 40. As such, the sensing portion 44 of the device 10, comprising the hot junction 29 of the thermocouple 28, the closed end 26a of the inner protective tube 26 and the closed end 24a of the outer protective sheath 24, is positioned within the open area 40a and surrounded by the walls 42 of the recessed portion 40.

During use and operation of the metallurgical vessel 12, the molten metal contained in the vessel 12 can freely flow into the recessed portion 40 of the vessel 12, thereby surrounding the sensing portion 44 of the temperature measuring device 10. The thermocouple 28 remains protected from the harsh erosive mechanical and chemical conditions of the molten metal environment by the insulating material, the oxygen-reducing material, the inner protective tube 26 and the outer protective sheath 24. Also, with the sensing portion 44 extending into the recessed portion 40, the sensing portion 44 remains in thermal equilibrium with the molten metal contained within the vessel 12. Also, after operation of the vessel 12 has ceased, the molten metal which has flowed into the open area 40a of the recessed portion 40 solidifies therein. Accordingly, when the vessel 12 is drained, the solidified metal remains in the recessed portion 40, surrounding the sensing portion 44 of the device 10, even after the vessel 12 is completely drained. The solidified metal will protect the sensing portion 44 and, particularly the thermocouple 28, from mechanical and chemical damage until the vessel 12 is refilled with the next charge of molten metal.

According to a further embodiment, the temperature measuring device 10 of the present invention is configured to introduce an inert gas into the molten metal by and through the plug 22. Specifically, at its second 22b, the porous body 23 of the plug 22 is in contact with a source of inert gas 35, preferably under pressure, by a gas inlet pipe 32. Inert gas is introduced into the body 23 of the plug 22 through the gas inlet pipe 32. By its porous nature, the porous body 23 of the plug 22 is configured to inject inert gas into the molten metal from the first end 22a of the plug 22 via the pores. As used herein, the term "porous body" includes any body having pores or channels that allow the passage of gas through the body from a gas source at the second end 22b into the molten metal at its first end 22a. For example, the porous body may be made of a naturally porous material or may be formed or drilled with small diameter gas pores or channels therein.

The metal housing 30 surrounding the plug 22 facilitates connection of the plug 22 to the inert gas source 35 by a connection between the metal housing 30 and the gas inlet pipe 32 at the second end 22b of the plug 22. Accordingly, inert gas flows from the gas inlet pipe 32 into and through the pores of the porous plug body 23 from the second end 22b of the plug 22 and is injected from the opposed first end 22a of the plug 22 into the molten metal. The connection between the metal housing 30 and the inert gas source 35 is also useful for guiding and protecting the connections of the thermocouple 28.

Preferably, the inert gas is nitrogen or argon. However, it will be understood by those skilled in the art that any gas of a sufficiently inert nature may be used. The inert gas is injected into the molten metal by the plug 22 with sufficient pressure and density such that fine bubbles of the inert gas are generated, but the injected inert gas does not cause an undesired outflow of the molten metal. The fine bubbles of the inert gas contact inclusions and micro-inclusions contained within the molten metal and, upon contact, the bubbles cause the inclusions and micro-inclusions in the molten metal to rise relatively quickly and migrate to the surface of the molten metal.

The bubbles of the injected inert gas also cause movement of the molten metal at and about the first end 22a of the plug 22. More particularly, the injected inert gas creates a vortex of molten metal about the sensing portion 44 of the device 10, and particularly about the thermocouple 28, creating homogenization of the molten metal temperature in the region of the sensing portion 44. Accordingly, the bubbles create a thermal equilibrium between the molten metal and the sensing portion 44, and specifically the thermocouple 28, thereby leading to more accurate temperature measurements. Specifically, because the sensing portion 44, including the thermocouple 28, is in close or direct contact with the molten metal in the recessed portion 40, homogenization of the temperature of the molten metal is achieved and the temperature measuring device 10 very quickly reaches its equilibrium temperature with the molten metal, so that measurement of the temperature of the molten metal may be performed very quickly and efficiently. The injected inert gas bubbles also contribute to the homogenization of the chemical composition of the molten metal.

In order to enable a continuous temperature measurement even during transfer operations of the vessel 12, a wireless data receiver (not shown) that transmits a data signal to a measuring instrument (not shown) is preferably used in conjunction with the temperature measuring device 10.

In preparing the temperature measuring device 10, the outer protective sheath 24 is isostatically pressed from a carbon-bonded material and then is trussed into the metal housing 30 with a refractory material, such as refractory concrete. Specifically, the portion of the outer protective sheath 24 having a straight cylindrical shape is secured within the cylindrical recess 46 of the first end 22a of the plug 22 by refractory concrete, such that the tapered closed end 24a of the outer protective sheath 24 extends away from the first end 22a of the plug 22. Then, the thermocouple 28 and the inner protective tube 26 are inserted into the interior of the outer protective sheath 24 via a corresponding opening 15 formed in the plug 22.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A temperature measuring device for molten metal comprising a porous plug having a first end and an opposed second end, an outer protective sheath having a closed end, the outer protective sheath extending away from the first end of the porous plug, an inner protective tube having a closed end, the inner protective tube being arranged within an interior of the outer protective sheath, and a thermocouple arranged within an interior of the inner protective tube, wherein the porous plug comprises a substantially refractory material and the outer protective sheath consists essentially of substantially refractory metal oxide and graphite;

wherein the second end of the porous plug is in contact with a source of inert gas and the porous plug is configured to inject a sufficient amount of the inert gas into the molten metal from the first end of the porous plug to cause movement of the molten metal at the first end of the porous plug; and wherein a junction of the thermocouple is proximate to the closed end of the inner protective tube.

2. The temperature measuring device according to claim 1, wherein the metal oxide of the outer protective sheath comprises aluminum oxide.

3. The temperature measuring device according to claim 1, wherein the inner protective tube comprises alumina.

4. The temperature measuring device according to claim 1, wherein the porous plug is at least partially encased in a metallic housing.

5. The temperature measuring device according to claim 4, wherein the metallic housing is connected to the source of inert gas at the second end of the porous plug.

6. The temperature measuring device according to claim 1, wherein the refractory material of the porous plug comprises one or more materials from the group consisting of alumina, magnesia and spinel.

7. The temperature measuring device according to claim 6, wherein the spinel is a magnesia-alumina spinel.

8. The temperature measuring device according to claim 1, wherein an intermediate space is formed between the inner protective tube and the outer protective sheath, an insulating material and an oxygen-reducing material being arranged in the intermediate space, the insulating material and the oxygen-reducing material being in a form of one of a powder mixture and a powder mixture that forms a tube, the powder mixture tube surrounding the inner protective tube with a spacing and/or the powder mixture tube being surrounded by the outer protective sheath with a spacing.

9. The temperature measuring according to claim 8, wherein an entire outer surface of the powder mixture tube engages substantially an entire inner surface of the outer protective sheath.

10. The temperature measuring device according to claim 9, wherein the insulating material comprises an oxide, and the oxygen-reducing material comprises a base metal.

11. The temperature measuring device according to claim 10, wherein the insulating material comprises aluminum oxide, and the base metal comprises aluminum.

* * * * *